US011900384B2

(12) United States Patent
Margolin et al.

(10) Patent No.: US 11,900,384 B2
(45) Date of Patent: Feb. 13, 2024

(54) RADIAL TIME SCHEMA FOR EVENT PROBABILITY CLASSIFICATION

(71) Applicant: PAYPAL, INC., San Jose, CA (US)

(72) Inventors: Itay Margolin, Pardesiya (IL); Shlomit Plavner, Tel Aviv (IL); Ofri Raviv, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/729,303

(22) Filed: Apr. 26, 2022

(65) Prior Publication Data

US 2022/0253860 A1    Aug. 11, 2022

Related U.S. Application Data

(63) Continuation of application No. 16/455,944, filed on Jun. 28, 2019, now Pat. No. 11,403,641.

(51) Int. Cl.
*G06Q 20/00* (2012.01)
*G06Q 20/40* (2012.01)
*G06Q 20/32* (2012.01)
*G06Q 20/38* (2012.01)

(52) U.S. Cl.
CPC ..... *G06Q 20/4016* (2013.01); *G06Q 20/3224* (2013.01); *G06Q 20/382* (2013.01)

(58) Field of Classification Search
CPC ................................. G06Q 20/4016
See application file for complete search history.

(56) References Cited

U.S. PATENT DOCUMENTS

| | | | |
|---|---|---|---|
| 8,688,579 B1* | 4/2014 | Ethington | G06V 10/44 |
| | | | 705/42 |
| 10,043,274 B2* | 8/2018 | Varslot | G06T 17/30 |
| 2002/0099649 A1 | 7/2002 | Lee et al. | |
| 2006/0116957 A1 | 6/2006 | May et al. | |
| 2007/0239606 A1 | 10/2007 | Eisen | |
| 2008/0140576 A1 | 6/2008 | Lewis et al. | |
| 2008/0162338 A1 | 7/2008 | Samuels et al. | |
| 2008/0195530 A1 | 8/2008 | Huennekens et al. | |
| 2009/0307778 A1 | 12/2009 | Mardikar | |
| 2010/0278405 A1* | 11/2010 | Kakadiaris | G16H 50/20 |
| | | | 382/131 |
| 2010/0280882 A1 | 11/2010 | Faith et al. | |

(Continued)

OTHER PUBLICATIONS

Solutions to the Problem, IEEE (Year: 2012).*

(Continued)

*Primary Examiner* — Bruce I Ebersman
(74) *Attorney, Agent, or Firm* — Haynes and Boone, LLP (57) ABSTRACT

Computer system security and efficiency of processing operations may be improved using techniques that are described relating to analyzing user actions based on time of day of occurrence, and using time of a day as a factor in determining whether a particular action should be allowed or disallowed. Past action times can be transformed to a two-dimensional representation using a radial time schema that avoids discontinuity. A probability distribution can indicate a likelihood of whether a new action fits a previous pattern. If a new user action is relatively unlikely due to time of day, the new user action might be denied/prevented from completing, thus enhancing computer system security and avoiding unnecessary computational processing costs.

20 Claims, 5 Drawing Sheets

(56) References Cited

U.S. PATENT DOCUMENTS

| | | | |
|---|---|---|---|
| 2011/0035788 A1 | 2/2011 | White et al. | |
| 2011/0282778 A1 | 11/2011 | Wright et al. | |
| 2012/0179558 A1 | 7/2012 | Fischer | |
| 2013/0268357 A1* | 10/2013 | Heath | G06Q 10/10 |
| | | | 726/26 |
| 2014/0180974 A1 | 6/2014 | Kennel et al. | |
| 2014/0233826 A1* | 8/2014 | Agaian | G16H 50/20 |
| | | | 382/133 |
| 2015/0347676 A1* | 12/2015 | Zhao | G16B 30/10 |
| | | | 702/20 |
| 2015/0379518 A1 | 12/2015 | May et al. | |
| 2016/0034640 A1* | 2/2016 | Zhao | G16B 20/00 |
| | | | 702/19 |
| 2016/0224724 A1* | 8/2016 | Zhao | G16B 30/10 |
| 2016/0328710 A1 | 11/2016 | Britton et al. | |
| 2017/0316150 A1* | 11/2017 | Deciu | G16B 30/00 |
| 2017/0342477 A1* | 11/2017 | Jensen | C12Q 1/6858 |
| 2020/0341466 A1* | 10/2020 | Pham | G06V 20/56 |
| 2020/0342600 A1* | 10/2020 | Sjöstrand | A61B 6/032 |
| 2020/0410496 A1* | 12/2020 | Margolin | G06Q 20/405 |
| 2022/0020189 A1* | 1/2022 | Zhang | G16H 50/50 |

OTHER PUBLICATIONS

Generic Authorizer: Authorizer Generic Banking Operations, IEEE (Year: 2012).*

Albanesi S., et al., "Predicting Consumer Default: A Deep Learning Approach," Oct. 7, 2019, 68 pages.

Nelson S., et al., "How Costly is Noise? Data and Disparities In Consumer Credit," May 5, 2021, 86 pages.

* cited by examiner

RADIAL TIME SCHEMA FOR EVENT PROBABILITY CLASSIFICATION

CROSS REFERENCE TO RELATED APPLICATIONS

This application is a continuation of and claims benefit of priority from U.S. patent application Ser. No. 16/455,944, filed Jun. 28, 2019, and is incorporated by reference herein in its entirety and for all purposes.

TECHNICAL FIELD

This disclosure relates to improvements in computer security and transaction analysis related to time of day, in various embodiments.

BACKGROUND

Companies are faced with a variety of computer security threats. Some of these threats include compromise of user accounts. Being able to detect when an account is being misused and/or has been taken over by an unauthorized party can mitigate or prevent damage that can occur from unauthorized use.

Applicant recognizes a need for improved detection of potentially compromised accounts and has developed a solution, as further discussed below.

DETAILED DESCRIPTION

Techniques are described relating to analyzing user transactions based on time of day of occurrence, and using time of a day as a factor in determining whether a new transaction should be allowed or disallowed, according to various embodiments.

People may have particular tendencies to engage in transaction at certain times of a day. A consumer might tend to purchase food, clothing, or other items at particular times during the day or night, depending on his or her schedule. A company employee who has database access might tend to execute database transactions at typical times revolving around her schedule.

When a new transaction occurs that does not fit a user's previous patterns, this can be an indication that someone other than the user has gained access to the user's account. E.g., a consumer's electronic payment transaction account or a company employee's system login account may have been compromised due to a security breach. Detecting whether such a security breach has occurred can help prevent and mitigate damage.

Techniques discussed below include analyzing a user's past transactional history and transforming time of days associated with transactions to a two-dimensional representation that avoids analysis discontinuities. A smoothed probability distribution map can be generated, based on the previous transaction times, that indicates a likelihood of whether a new transaction fits previous patterns of use. If a new transaction is particularly unlikely due to the time of day at which the transaction is occurring, the new transaction might be denied/prevented from completing. Denial of the transaction may also be based on additional factors besides the time of day. However, in many situations, time of day provides an independent signal that can be helpful in indicating the overall risk in allowing a transaction to proceed. Thus, the techniques outlined below provide for increased computer and data security, according to various embodiments, by preventing transactions that may not have originated from an authorized user of an account.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
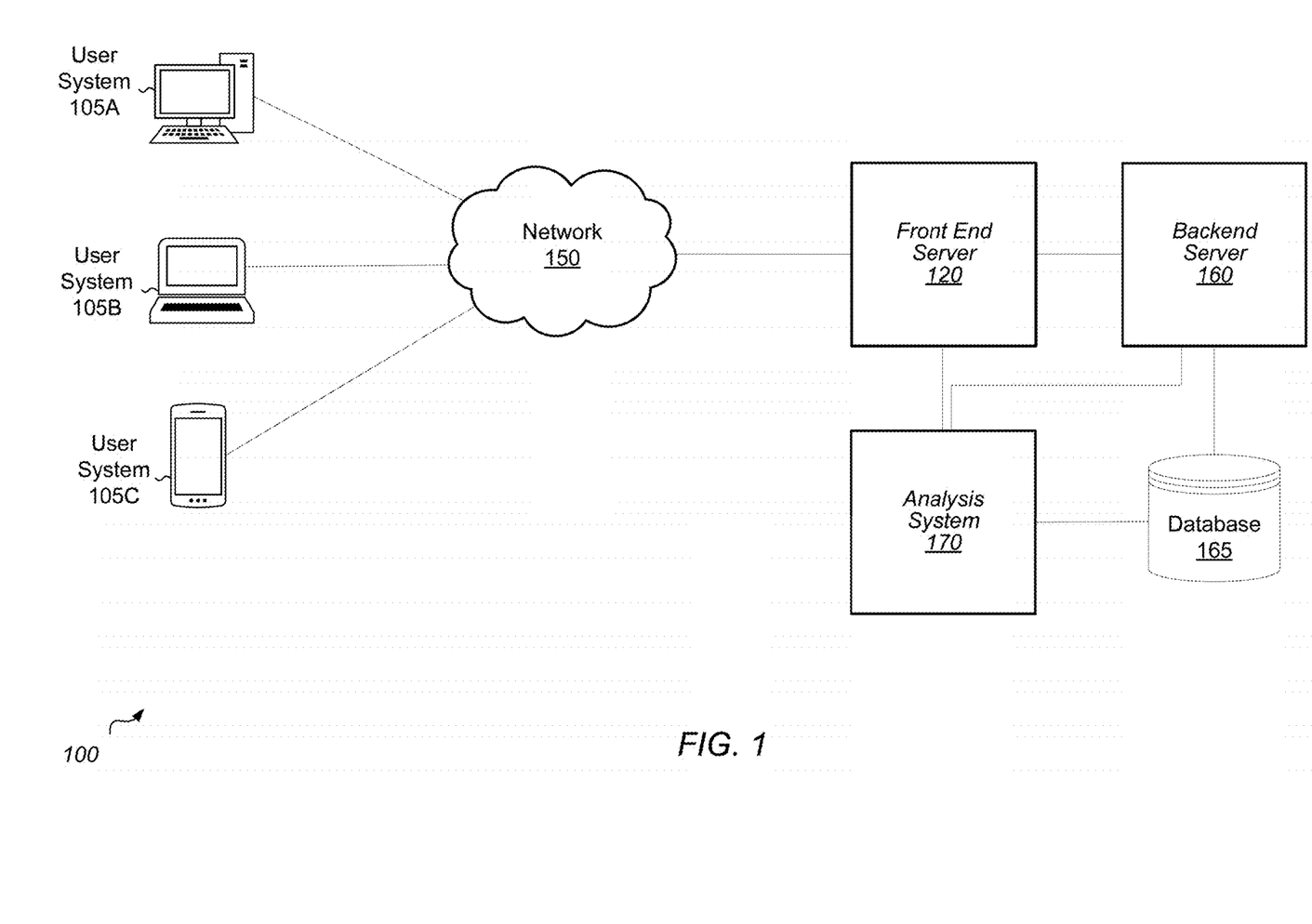
FIG. 1 illustrates a block diagram of a system including user systems, a front end server, backend server, analysis system, and database, according to some embodiments.

Turning to FIG. 1, a block diagram of a system 100 is shown, according to various embodiments. In this diagram, system 100 includes user systems 105A, 105B, and 105C. System 100 also includes front end server 120, backend server 160, database 165, analysis system 170, and network 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present and utilized. Components may be combined with one other and/or separated into one or more systems in this figure, as in other figures.

User systems 105A, 105B, and 105C ("user systems 105") may be any user computer system that can potentially interact with front end server 120, according to various embodiments. Front end server 120 may provide web pages and/or other content that facilitate one or more services, such as account access and electronic payment transactions (as may be provided by PayPal.com™). Front end server 120 may thus facilitate access to various electronic resources, which can include an account, data, and various software programs/functionality, etc. A user of user system 105A may receive communications from front end server 120. Front end server 120 may be any computer system configured to provide access to electronic resources. This can include providing communications to users and/or web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by backend server 160 and/or database 165. Database 165 may include various data, such as user account data, system data, and any other information. Multiple such databases may exist, of course, in various embodiments, and can be spread across one or more data centers, cloud computing services, etc. Front end server 120 may comprise one or more computing devices each having a processor and a memory. Network 150 may comprise all or a portion of the Internet.

Front end server 120 may correspond to an electronic payment transaction service such as that provided by PayPal™ in some embodiments, though in other embodiments, front end server 120 may correspond to different services and functionality. Front end server 120 and/or backend server 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via front end server 120 and/or backend server 160, including but not limited to stocks, commodities, gift cards, incentive points (e.g. from airlines or hotels), etc. Front end server 120 may also correspond to a system providing functionalities such as API access, a file server, or another type of service with user accounts in some embodiments (and such services can also be provided via front end server 120 in various embodiments).

Database 165 can include a transaction database having records related to various transactions taken by users of a transaction system in the embodiment shown. These records can include any number of details, such as any information related to a transaction or to an action taken by a user on a web page or an application installed on a computing device (e.g., the PayPal™ app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity). As will be appreciated, there may be more than simply one database in system 100. Additional databases can include many types of different data beyond transactional data. Any description herein relative to database 165 may thus be applied to other (non-pictured) databases as well.

Backend server 160 may be one or more computing devices each having a memory and processor that enable a variety of services. Backend server 160 may be deployed in various configurations. In some instances, all or a portion of the functionality for web services that is enabled by backend server 160 is accessible only via front end server 120 (e.g. some of the functionality provided by backend server 160 may not be publicly accessible via the Internet unless a user goes through front end server 120 or some other type of gateway system). Backend server 160 may perform operations such as risk assessment, checking funds availability, among other operations.

Analysis system 170 likewise may be one or more computing devices each having a memory and processor. In various embodiments, analysis system 170 performs operations related to assessing likelihood of a transaction based upon time of day. Analysis system 170 may transmit information to and/or receive information from a number of systems, including database 165, front end server 120, and back end server 160, as well as other systems, in various embodiments.

Figure 2:
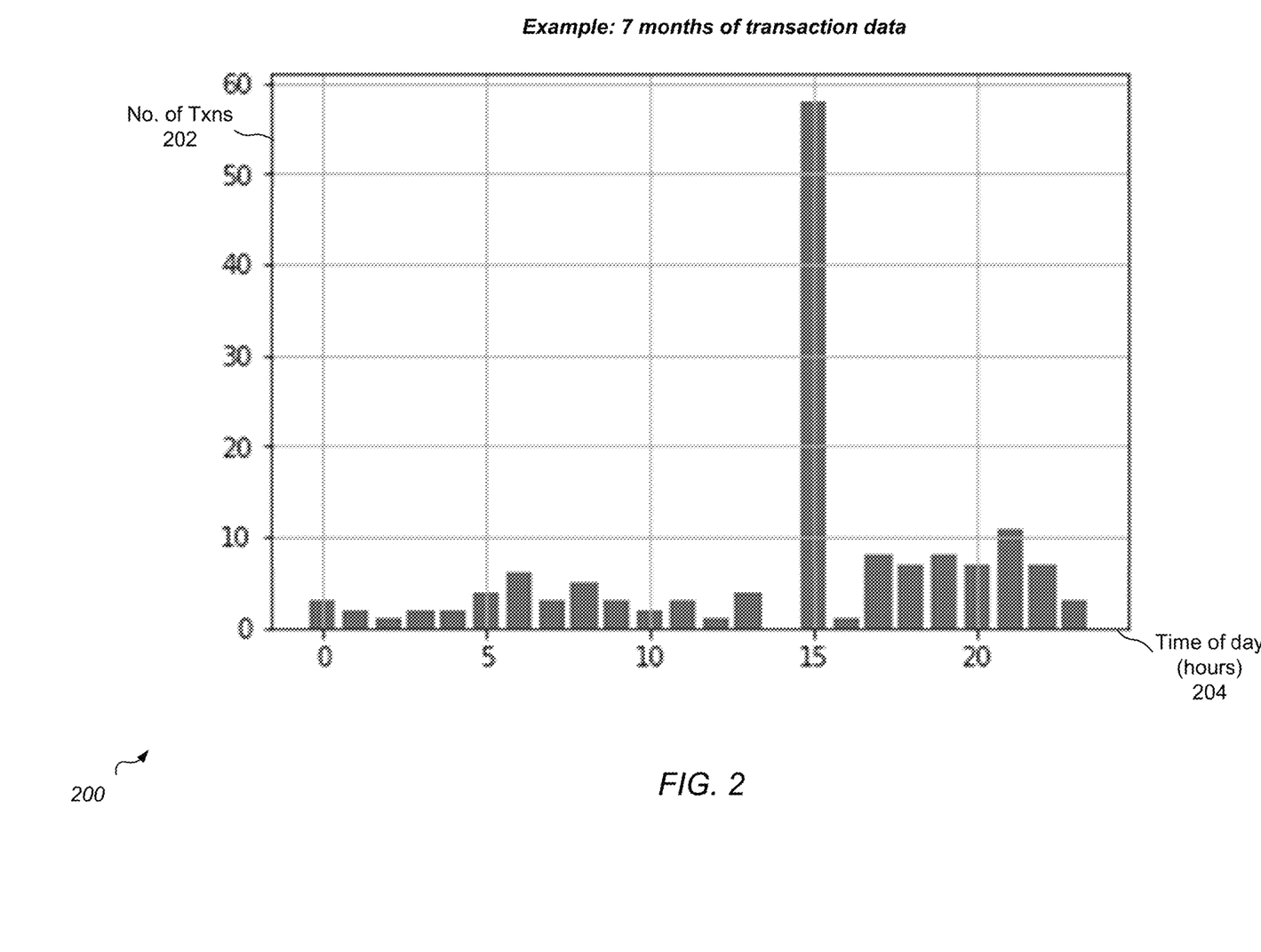
FIG. 2 illustrates a diagram of one example of transaction occurrence based on time of day for a particular user account, according to some embodiments.

Turning to FIG. 2, a diagram 200 is shown of one example of transaction occurrence based on time of day for a particular user account, according to some embodiments. In this figure, the Y-axis shows the number of transactions 202 while the X-axis shows the time of day in hours 204. This example shows that over a period of time, a user may be more likely to conduct transactions at certain times of day than others. The entry for "15" (3 p.m.) shows a very high relative number of transactions, while other times of day have lesser numbers of transactions.

Attempting to analyze transactions based upon the hour of day in which they occur (e.g. 3:00 p.m. to 3:59 p.m.) is not sufficient, however, to achieve best results in determining whether to allow a transaction. Binning techniques (e.g. assigning transactions to an hour long window) can cause discontinuities and inaccuracies. Further, the discontinuity at midnight (when the old day changes to a new one and the time clock resets) can also cause difficulties. The solutions described herein help overcome these issues.

Figure 3:
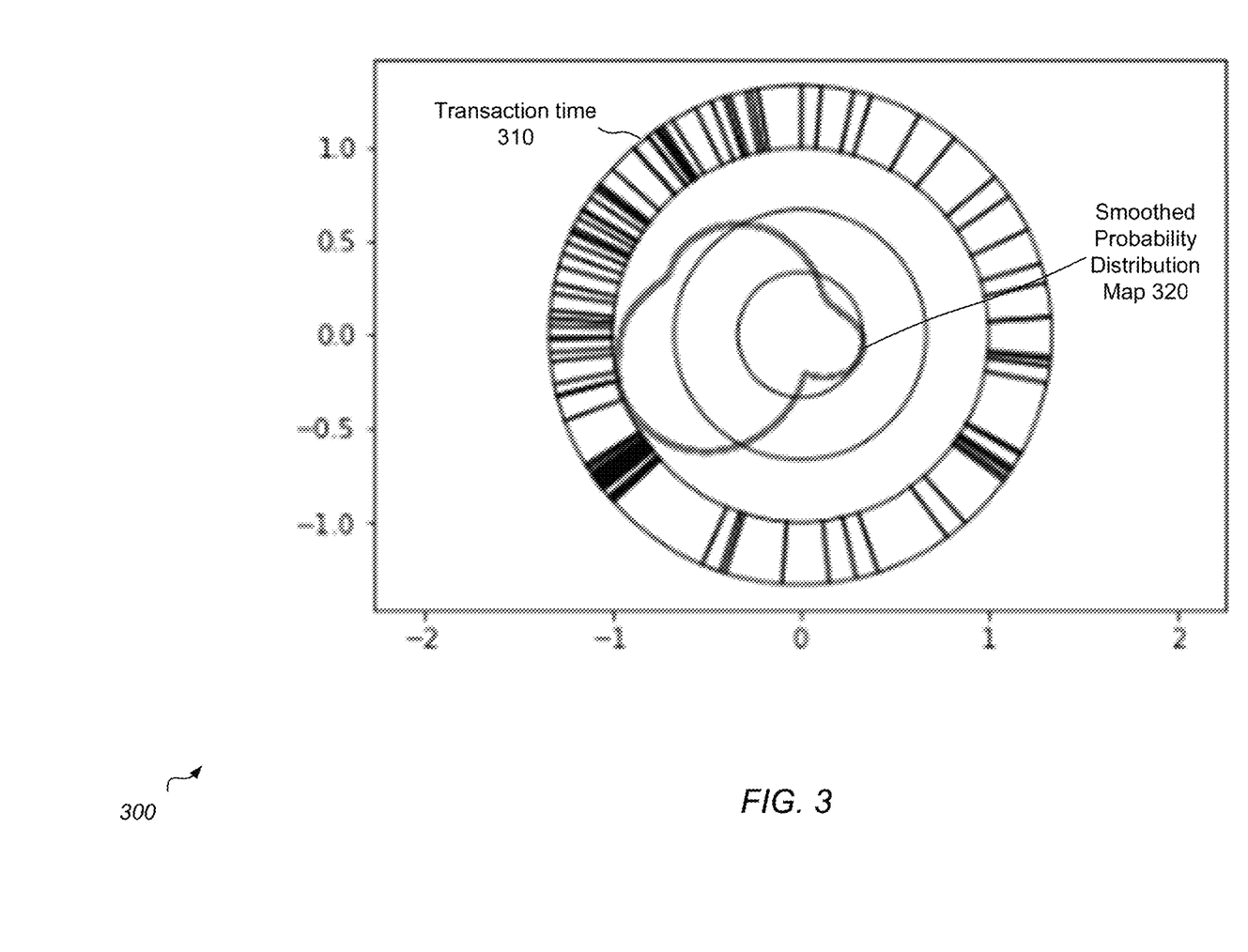
FIG. 3 illustrates a diagram of a representation of a smoothed probability distribution map, according to various embodiments.

Turning to FIG. 3, a diagram 300 is shown of a representation of a smoothed probability distribution map, according to various embodiments. This distribution map, as described below, can be used as a model to determine whether or not a transaction conducted by a user is statistically particularly likely or unlikely based on past transactions. This map may be combined with other factors as well (e.g. additional risk models) in order to determine whether a transaction should be approved.

Transaction times 310 are shown as small black lines in the outer circle band of this figure. These lines are two-dimensional (2D) representations of times in the past at which a user has conducted a transaction. The times are centered around a daily (e.g. 24 hour cycle. Using this representation, the discontinuity at midnight is avoided. Smoothed probability distribution map 320 is a smoothed mapping of the transaction times. Techniques for generating this distribution map are described further below. However, this map generally indicates there are some times at which the particular user is more likely to conduct a transaction (e.g. most of the left side of the diagram) and some times at which the particular user is less likely to conduct a transaction (e.g. most of the right side of the diagram).

Figure 4:
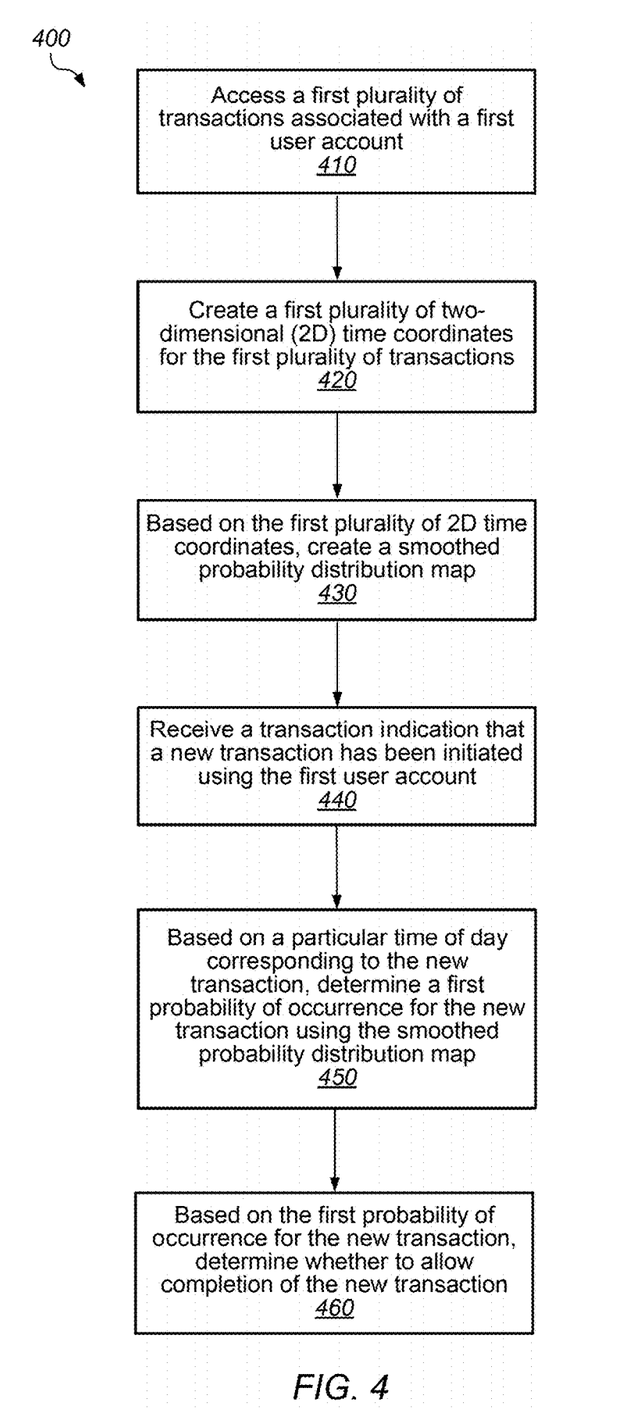
FIG. 4 illustrates a flowchart of a method relating to using a smoothed probability distribution map and a probability of transaction occurrence to determine whether to allow completion of a new transaction, according to various embodiments.

Turning to FIG. 4, a flowchart is shown of a method 400 relating to using a smoothed probability distribution map and a probability of transaction occurrence to determine whether to allow completion of a new transaction, according to various embodiments.

Operations described relative to FIG. 4 may be performed by any suitable computer system and/or combination of computer systems, including analysis system 170, in various embodiments. For convenience and ease of explanation, operations described below will simply be discussed relative to analysis system 170 rather than any other system, however. Further, various operations and elements of operations discussed below may be modified, omitted, and/or used in a different manner or different order than that indicated. Thus, in some embodiments, analysis system 170 may perform one or more operations while another system might perform one or more other operations.

In operation 410, analysis system 170 accesses a first plurality of transactions associated with a first user account, according to various embodiments. Each of these first plurality of transactions may have a corresponding time of day.

These transactions may be numerous different types in different embodiments, but are electronic payment transactions in one embodiment. The transactions may also be database query transactions, system access transactions, account login transactions, etc. Generally however, the present techniques may be useful for transactions that users have a tendency to execute at certain times of day. In the case of electronic payment transactions (as may be conducted with a PayPal™ or other type of payment account), users may have a tendency to make purchases at certain times of day. Someone who typically works the hours of 8:30 a.m. to 5:30 p.m., for example, may be likely to purchase things on their lunch break from 12 p.m. to 1 p.m. or in the evening between 7 p.m. and 10 p.m., but highly unlikely to make purchases between the hours of 2 a.m. and 6 a.m., for example.

The transactions that are accessed in this operation have been previously completed, according to various embodiments, and may have variety of transactional data associated with them. This day may include amount of purchase, type of funding instrument, merchant identification, information about the device used to purchase (e.g. smartphone vs. laptop or desktop computer), etc. Many different pieces of information about these transactions may be available. Each of the transactions may also have a corresponding time of day, e.g., a time at which the transaction was conducted. This information may be maintained in hours, minutes, and seconds (along with a date). A first purchase may have been made at 0900:53:23 (9 a.m., 53 minutes, and 23 seconds) for example, while another purchase may have been made at 2300:12:30 (11 p.m., 12 minutes, and 30 seconds).

In operation 420, analysis system 170 creates a first plurality of two-dimensional (2D) time coordinates for the first plurality of transactions by transforming the time of day for each of the first plurality of transactions to a two-dimensional coordinate plane, according to various embodiments.

When determining if a transaction is likely or unlikely to occur at a particular time of day, a problem can arise with discontinuity. If daily (e.g. 24 hour) time is mapped in a single dimension from 00:00:00 to 23:59:59 (hh:mm:ss) for example, a transaction that occurs just shortly after midnight may appear quite distant, timewise, from a transaction that occurs just before midnight, when the daily clock resets. In reality, of course, the likelihood of a user to perform a transaction at 11:59 p.m. is not necessarily much different than the likelihood of the user to perform a transaction at 12:01 a.m. For analytical purposes, however, this discontinuity can be a problem.

Transforming time of day for a transaction into a two-dimensional plane can avoid this problem, however. Instead of mapping time onto a line (e.g. one dimension), time can be mapped onto a 2D circle (imagine an analog clock with only one single hand used to indicate time, where the hand pointing straight up would represent midnight and the hand pointing straight down would represent noon, for example).

Transforming the time of day for various transactions can be performed using sine and cosine functions, in various embodiments. As one example, the time of day can be converted to the number of seconds elapsed since midnight. E.g. 09:23:15 becomes 33,795 seconds. This can then be converted into a radians value R by multiplying 33,795*(2π/86,400), where 86,400 is an assumed value for number of seconds per day (24*60*60). The X and Y coordinates for the time of day, within the 2D plane, can then be calculated using sine(R) and cosine(R) respectively. This transformation will map the time of day for each transaction to a unit circle (e.g. radius=1.0). Midnight is mapped to (0,1) for example, while 6 a.m. is mapped to (1, 0).

In operation 430, based on the first plurality of 2D time coordinates for the first transactions, analysis system 170 creates a smoothed probability distribution map of transaction occurrence within a daily time period for the first user account, according to various embodiments.

If smoothing is not used to create a probability distribution, then the resulting distribution can suffer from discontinuity errors. For example, if each transaction was binned into a one hour period (e.g. 1 p.m. to 1:59 p.m., 2 p.m. to 2:59 p.m., etc.), then a transaction conducted at 2:57 p.m. might be treated significantly different than a transaction conducted at 3:01 p.m., even though these transactions are in fact quite similar in their time of day (only four minutes apart). Instead, a smoothed probability distribution can give a more accurate reading by, for example, assuming that a transaction that occurs at 2:57 p.m. is still somewhat likely to occur a few minutes in either direction (but less likely to occur as the distance in time increases going away from the time of the original transaction).

Thus, creating the smoothed probability distribution can include: for each of the first plurality of 2D time coordinates, assigning a decaying likelihood of probability to that 2D time coordinate, where the decaying likelihood of probability is highest at that 2D time coordinate and decreases at time distances farther from that 2D time coordinate. The kernel density estimation (KDE) function can be used in some embodiments to assign a decaying likelihood of probability to each 2D time coordinate. This function may center a gaussian distribution around the time of the transaction, for example, where the exact time of the transaction is weighted as a relative 1.0 in terms of probability, but then decreases in terms of distance. Different parameters for the KDE can be used in different embodiments.

In the example above, the weighted probability for a 14:57:00 transaction (2:57 p.m. and zero seconds) might be such that each second surrounding the transaction gets a slightly lesser probability. 14:57:01 and 14:56:59 might have a 0.999 probability, 14:57:02 and 14:56:58 might have a 0.9985 probability, 14:59:00 and 14:55:00 might have a 0.86 probability, etc. Thus, each of the 2D time coordinates can be given a 1.0 weighting at that coordinate, but then surrounding 2D time coordinates are also given slightly lesser weightings. Smoothing schemes other than KDE can be used, of course, if desired (e.g. transaction probability could be decreased linearly from 1.0 to 0.0 surrounding a 15 minute window on both sides of the transaction time, as one example).

The overall probability distribution could then be determined by dividing the weighted 2D coordinates by the total number of transactions. E.g. if a user had 100 different transactions used to create the smoothed probability map, each of the 2D coordinates (e.g. each of 86,400 possible seconds in a day) could be summed up (where each transaction gives a time coordinate a particular weighting from 0.0 to 1.0) and then each of those coordinates could be divided by 100 (total number of transactions) to find an overall likelihood of a new transaction occurring at that particular time, based on the user's history. Other methods of smoothing are possible, of course (e.g. varying the time intervals for the smoothing differently than one second; larger or smaller internals could be used if desired).

Note that in some embodiments, prior to using the smoothed probability distribution map, it may be helpful to analyze the distribution for a user to see if the user actually has any significant behavioral patterns in making their transactions. For example, if a particular user has made 100 transactions in the last three months, and each of these transactions is distributed roughly evenly within the daily (24 hour) clock cycle, then the time at which a new transaction is conducted is not particularly significant—that user may be just as likely to engage in a transaction at 1:00 a.m. as she would to transact at 1:00 p.m.

Note that the recency of transactions may affect the creating of the smoothed probability distribution map. For example, analysis system 170 may consider only transactions conduced within a recent period (e.g. last year, last 6 months, last 3 months, last 4 weeks, or some other period). Transactions older than a threshold recency may be ignored. Thus method 400 can include selecting a first plurality of transactions from a larger quantity of transactions associated with the first user account, where the selected is based on the first plurality of transactions occurring within a particular threshold length of time from the time of selecting.

Additionally, more recent transactions can be weighted more heavily than older transactions when making the smoothed probability distribution map. For example, a transaction occurring within the last month might have a relative weighting of 1.0 associated with it, while transactions occurring between one and two months ago could be weighted with a 0.8 weighting, transactions occurring between two and three months ago could get a 0.6 weighting, etc. In other words, a new transaction may be considered more important in terms of predicting user behavior than an older transaction, in various embodiments.

An entropy measurement for the smoothed probability distribution map can be taken by analysis system 170 to determine how much variation exists in the user's behavior at different types of day. Based on the amount of entropy (e.g. variation between the different 2D transaction coordinate time points), analysis system 170 might or might not use the smoothed probability distribution map when determining whether to allow the new transaction. If the entropy meets a certain threshold level (which may be denoted as the parameter "T" for the decisioning model), then the smoothed probability distribution map is actually used to determine if the new transaction is more likely or less likely to be genuine based on the user's previous history. If the entropy level is insufficient, however, then the time of day for the user's new transaction might be disregarded in assessing the risk of the transaction. Thus, determining whether to allow completion of a new transaction can be based on an entropy measurement.

In operation 440, analysis system 170 receives a transaction indication that a new transaction has been initiated using the first user account, according to various embodiments. Thus, once a smoothed probability distribution map is created for a user, it can be determined whether a new transaction happens to be particularly likely or unlikely based on that user's history.

The new transaction may have a particular time of day corresponding to it, such as the time the transaction was initiated. The new transaction can be initiated by a user clicking on a payment button within a checkout flow of a website, for example. The new transaction can also be initiated when the user submits a command for execution (e.g. submitting a database query, executing a script on a computer, etc.). As noted elsewhere, the present techniques can be used in the context of electronic payment transactions, but other types of transactions as well that may have some variation based on time of day. The new transaction, in the case of an electronic payment transaction, may have a number of other data associated with it as well.

In operation 450, based on a particular time of day corresponding to the new transaction, analysis system 170 determines a first probability of occurrence for the new transaction using the smoothed probability distribution map, according to various embodiments. This can include taking the time of day for the new transaction, transforming it to 2D coordinates, and then seeing what the associated probability is for those 2D coordinates within the smoothed probability distribution map. The first probability of occurrence could be a value between 0.0 and 1.0, for example, corresponding to a 0% and 100% likelihood.

To use extreme examples, if a user has 100 past transactions that all occurred at 15:00:00 (3 p.m. and 0 seconds), then a new transaction also occurring at exactly 3 p.m. may have a 100% (1.0) likelihood. Conversely, if that same user has a new transaction occur at 02:45:00 (2:45 a.m. and 0 seconds) then the likelihood may be 0%. Otherwise, in more typical usage patterns, another particular likelihood may be determined from the smoothed probability distribution map.

In operation 460, based on the first probability of occurrence for the new transaction, analysis system 170 determines whether to allow completion of the new transaction, according to various embodiments.

The new transaction may be allowed or disallowed based not just on the probability of its occurrence, but based on other factors as well. In the case of electronic payment transactions, for example, a risk model may evaluate many different pieces of data associated with the transaction. This can include transaction amount, funding source, age of account (e.g. how long a user's history is for an account), device data, device location, merchant location, type of good or service being purchased, etc. The risk model may provide an overall score (e.g. out of 100) that would ordinarily dictate whether an electronic payment transaction is allowed, in various embodiments.

Based on the transaction data, some transactions may be allowed as clearly low-risk (e.g. a user is purchasing a coffee for $1.99 at a merchant the user has frequently transacted with in the past). Other transactions may be disallowed as clearly high-risk (e.g. a user with a new account based in the United States is trying to purchase $30,000 worth of electronics in Russia using a bank checking account that has never been previously used for a purchase).

Other electronic payment transactions may exist in a "gray area" however where the transaction may have some risky characteristics, but not so risky (or safe) that it is an easy decision whether or not to allow the transaction to proceed. For these types of payment transactions, time of day analysis may be particularly helpful in determining whether to allow the transaction. Consider a risk model allows all transactions that have a score of 70 or more out of 100, for example. A new transaction is evaluated and deemed to have a score of 69.9. Ordinarily, this transaction might be declined. Time of day analysis however might indicate it is highly likely that the user would transact at this particular time of day. The transaction risk score might be increased by a small amount (e.g. 0.1, 0.5) such that the transaction would actually be approved instead of being declined. Likewise, a new transaction might get a risk model score of 70.1—which would normally mean the transaction gets approved. However, the time of day analysis shows that the user is transacting at a very unlikely time of day (e.g. 3 a.m. where the user has never made a previous purchase between the hours of 1 a.m. and 7 a.m.). In this example, the new transaction might have its risk score adjusted downward below the 70.0 threshold, and the transaction would be denied.

The amount of adjustment made in such a risk score can be based on the particular likelihood for the new transaction as determined from the smoothed probability distribution map. Thus, method 400 can include receiving, from a transaction risk model, a transaction risk score for a new transaction that is based on a plurality of transaction details for the new transaction (e.g. different transaction-related data), and then adjusting the transaction risk score based on the first probability of occurrence (as determined using the smoothed probability distribution map).

Following approval or denial of a new transaction, the user may be notified of the success or failure of the transaction. In the case of an electronic payment transaction, the user may receive a web page, email, or some other communication indicating the transaction was a success, for example. In the event of a database query or other computer system transaction that might relate to computer security (e.g. executing a script) the user might receive an error message if the transaction was disallowed.

Computer-Readable Medium

Figure 5:
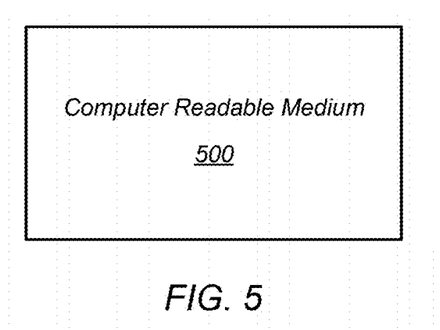
FIG. 5 is a diagram of a computer readable medium, according to some embodiments.

Turning to FIG. 5 a block diagram of one embodiment of a computer-readable medium 500 is shown. This computer-readable medium may store instructions corresponding to the operations of FIG. 4 and/or any techniques described herein. Thus, in one embodiment, instructions corresponding to analysis system 170 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 6:
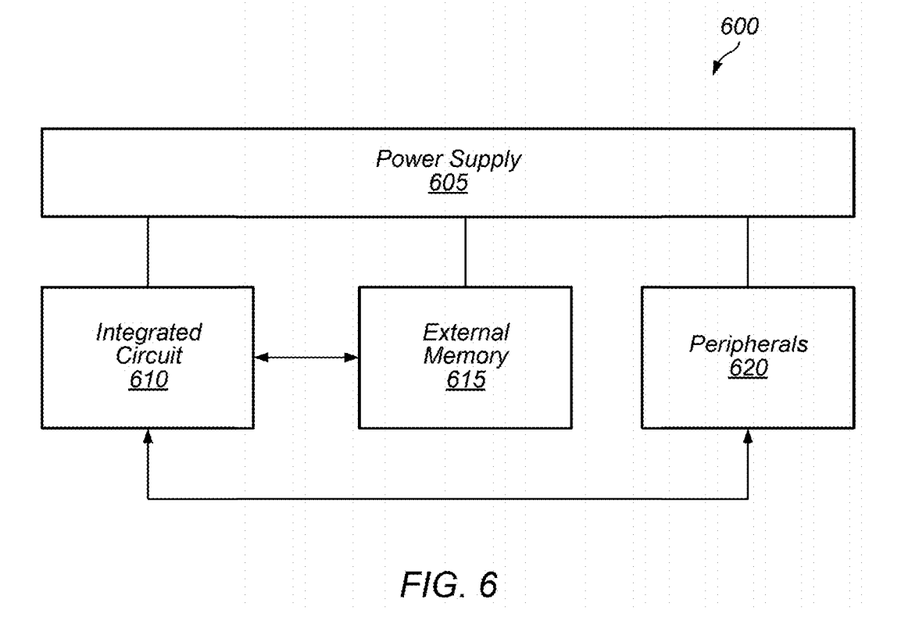
FIG. 6 is a block diagram of a system, according to some embodiments.

In FIG. 6, one embodiment of a computer system 600 is illustrated. Various embodiments of this system may be included in front end server 120, backend server 160, analysis system 170, or any other computer system.

In the illustrated embodiment, system 500 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices. By way of further explanation, in some embodiments system 600 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
    a processor; and
    a non-transitory computer-readable medium having stored thereon instructions executable to cause the system to perform operations comprising:
        generating a plurality of two-dimensional (2D) time coordinates corresponding to a plurality of positions on a 2D coordinate plane, wherein each of the plurality of 2D time coordinates is based on a respective transaction of a plurality of electronic transactions, wherein the plurality of electronic transactions comprise electronic transactions initiated by one or more particular user accounts of a group of one or more user accounts including a first user account, and wherein generating the plurality of 2D time coordinates comprises mapping a time of day for each of the plurality of electronic transactions to a position on the 2D coordinate plane;
        creating a transaction probability distribution map based on the plurality of 2D time coordinates, wherein the transaction probability distribution map is indicative of a likelihood of occurrence of a transaction initiated by one of the group of user accounts for a given time of day;
        receiving an indication that an uncategorized electronic transaction has been initiated by a specific user account via a user computing device, wherein the uncategorized electronic transaction was initiated at a particular time of day via the user computing device;
        calculating a first position on the 2D coordinate plane by mapping the particular time of day to the 2D coordinate plane;
        based on the first position on the 2D coordinate plane, using the transaction probability distribution map to determine a particular likelihood of an authorized user of the specific user account having initiated the uncategorized electronic transaction at the particular time of day;
        generating a transaction risk score based on the particular likelihood of the authorized user having initiated the uncategorized electronic transaction at the particular time of day;
        determining whether to authorize or deny the uncategorized electronic transaction based on the transaction risk score; and
        transmitting an indication of whether the uncategorized electronic transaction is authorized or denied.

2. The system of claim 1, wherein the transaction probability distribution map indicates a higher likelihood of a transaction occurrence when a time of a transaction initiation is closer to one or more times of previously initiated transactions, and a lower likelihood of a transaction occurrence when the time of the transaction initiation is further from the one or more times of the previously initiated transactions.

3. The system of claim 1, wherein the generating the transaction risk score comprises:
    determining a first transaction risk score based on a risk model; and
    modifying the first transaction risk score based on the particular likelihood of the authorized user having initiated the uncategorized electronic transaction at the particular time of day.

4. The system of claim 1, wherein the specific user account is the first user account.

5. The system of claim 1, wherein the determining whether to authorize or deny the uncategorized electronic transaction is based on the transaction risk score being above or below a particular threshold score.

6. The system of claim 1, wherein the operations further comprise smoothing the transaction probability distribution map, and wherein the transaction probability distribution map does not have a discontinuity at midnight.

7. The system of claim 1, wherein the uncategorized electronic transaction was initiated via a secured HTTP request via the Internet.

8. A non-transitory computer-readable medium having stored thereon instructions executable by a computer system to cause the computer system to perform operations comprising:
    generating a plurality of two-dimensional (2D) time coordinates corresponding to a plurality of positions on a 2D coordinate plane, wherein each of the plurality of 2D time coordinates is based on a respective transaction of a plurality of electronic transactions, wherein the plurality of electronic transactions comprise electronic transactions initiated by one or more particular user accounts of a group of one or more user accounts including a first user account, and wherein generating the plurality of 2D time coordinates comprises mapping a time of day for each of the plurality of electronic transactions to a position on the 2D coordinate plane;
    creating a transaction probability distribution map based on the plurality of 2D time coordinates, wherein the transaction probability distribution map is indicative of a likelihood of occurrence of a transaction initiated by one of the group of user accounts for a given time of day;
    receiving an indication that an uncategorized electronic transaction has been initiated by a specific user account via a user computing device, wherein the uncategorized electronic transaction was initiated at a particular time of day via the user computing device;
    calculating a first position on the 2D coordinate plane by mapping the particular time of day to the 2D coordinate plane;
    based on the first position on the 2D coordinate plane, using the transaction probability distribution map to determine a particular likelihood of an authorized user of the specific user account having initiated the uncategorized electronic transaction at the particular time of day;
    generating a transaction risk score based on the particular likelihood of the authorized user having initiated the uncategorized electronic transaction at the particular time of day;

determining whether to authorize or deny the uncategorized electronic transaction based on the transaction risk score; and transmitting an indication of whether the uncategorized electronic transaction is authorized or denied.

9. The non-transitory computer-readable medium of claim 8, wherein the transaction probability distribution map indicates a higher likelihood of a transaction occurrence when a time of a transaction initiation is closer to one or more times of previously initiated transactions, and a lower likelihood of a transaction occurrence when the time of the transaction initiation is further from the one or more times of previously initiated transactions.

10. The non-transitory computer-readable medium of claim 8, wherein the generating the transaction risk score comprises:

determining a first transaction risk score based on a transaction risk model configured to analyze a plurality of transaction data factors; and modifying the first transaction risk score based on the particular likelihood of the authorized user having initiated the uncategorized electronic transaction at the particular time of day.

11. The non-transitory computer-readable medium of claim 8, wherein the specific user account is not the first user account.

12. The non-transitory computer-readable medium of claim 8, wherein the determining whether to authorize or deny the uncategorized electronic transaction is based on the transaction risk score being above or below a particular threshold score.

13. The non-transitory computer-readable medium of claim 8, wherein the operations further comprise smoothing the transaction probability distribution map, and wherein the transaction probability distribution map does not have a discontinuity at midnight.

14. A method, comprising:

receiving, at a computer system, an indication that an uncategorized electronic transaction has been initiated by a specific user account via a user computing device, wherein the uncategorized electronic transaction was initiated at a particular time of day via the user computing device;

calculating a first position on a 2D coordinate plane by mapping the particular time of day to the 2D coordinate plane;

based on the first position on the 2D coordinate plane, using a transaction probability distribution map to determine a particular likelihood of an authorized user of the specific user account having initiated the uncategorized electronic transaction at the particular time of day, wherein the transaction probability distribution map was created using operations comprising:

generating a plurality of two-dimensional (2D) time coordinates corresponding to a plurality of positions on a 2D coordinate plane, wherein each of the plurality of 2D time coordinates is based on a respective transaction of a plurality of electronic transactions, wherein the plurality of electronic transactions comprise electronic transactions initiated by one or more particular user accounts of a group of one or more user accounts including a first user account, and wherein generating the plurality of 2D time coordinates comprises mapping a time of day for each of the plurality of electronic transactions to a position on the 2D coordinate plane; and creating the transaction probability distribution map based on the plurality of 2D time coordinates, wherein the transaction probability distribution map is indicative of a likelihood of occurrence of a transaction initiated by one of the group of user accounts for a given time of day;

generating a transaction risk score based on a transaction risk model and the particular likelihood of the authorized user having initiated the uncategorized electronic transaction at the particular time of day;

determining whether to authorize or deny the uncategorized electronic transaction based on the transaction risk score; and transmitting an indication of whether the uncategorized electronic transaction is authorized or denied.

15. The method of claim 14, wherein the transaction risk model is configured to assess transaction risk based on a plurality of data factors, including one or more of funding source, age of account, device data, device location, merchant location, type of good or service being purchased, or transaction amount.

16. The method of claim 14, wherein the generating the transaction risk score comprises:

determining a first transaction risk score based on the transaction risk model; and modifying the first transaction risk score based on the particular likelihood of the authorized user having initiated the uncategorized electronic transaction at the particular time of day.

17. The method of claim 14, wherein the specific user account is the first user account.

18. The method of claim 14, wherein the determining whether to authorize or deny the uncategorized electronic transaction is based on the transaction risk score being above or below a particular threshold score.

19. The method of claim 14, wherein the creating the transaction probability distribution map comprises smoothing the transaction probability distribution map, and wherein the transaction probability distribution map does not have discontinuities.

20. The method of claim 14, wherein the uncategorized electronic transaction was initiated via a secured HTTP request via the Internet.

* * * * *